J. N. LAVERY.
REVERSING MECHANISM.
APPLICATION FILED SEPT. 15, 1916.
1,257,253.
Patented Feb. 19, 1918.
2 SHEETS—SHEET 1.
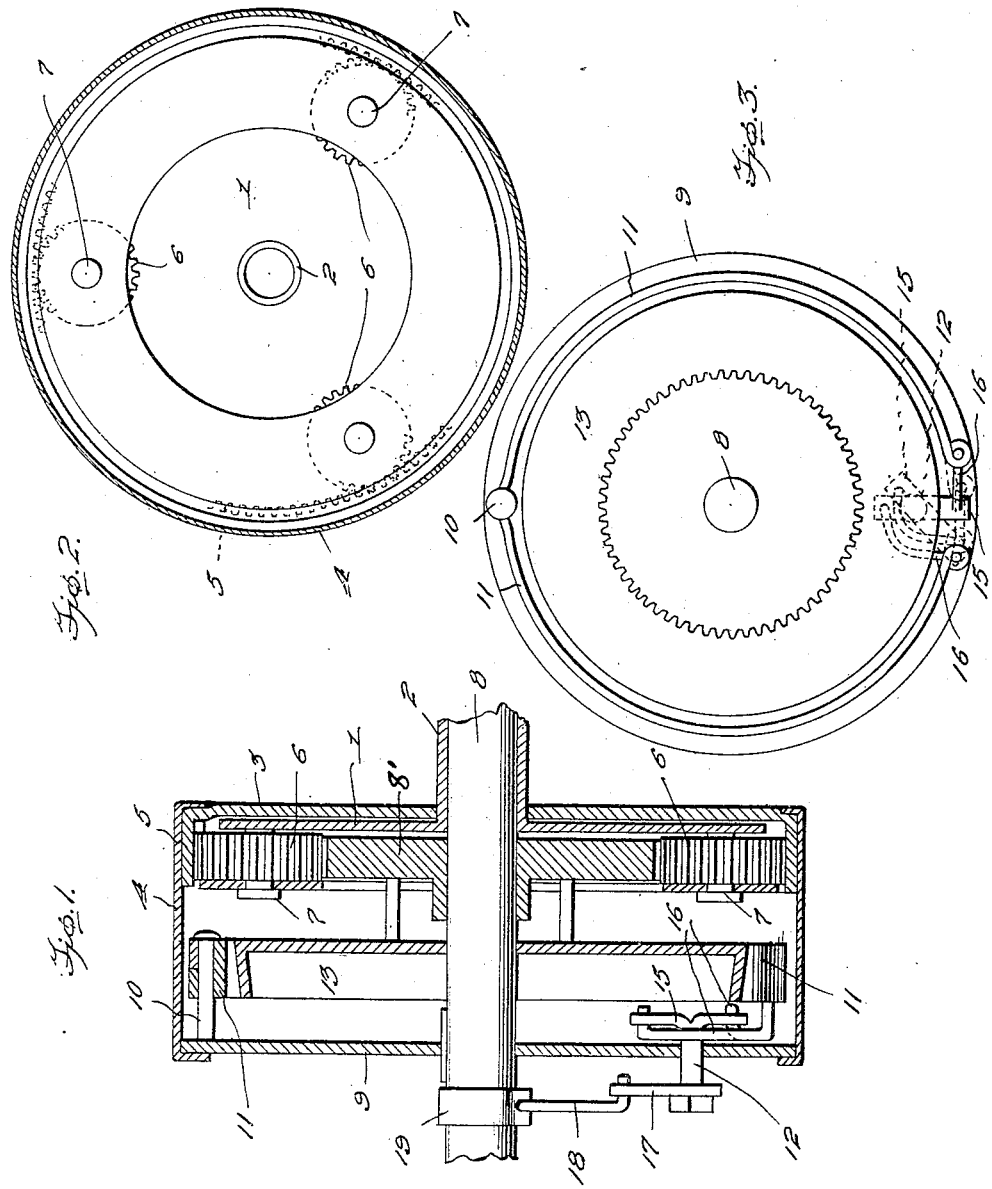
Inventor
J. N. Lavery.
By John Louis Waters
Attorney

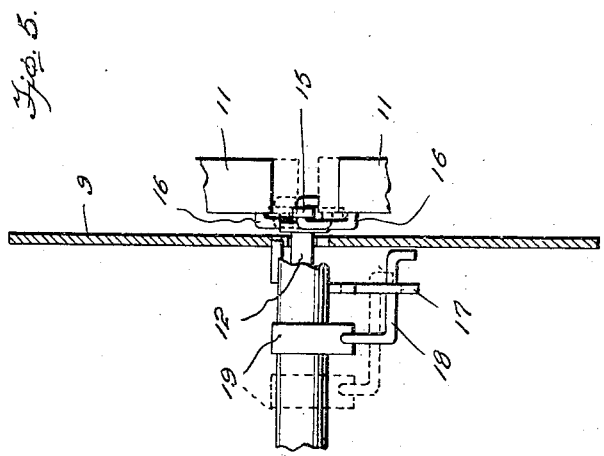
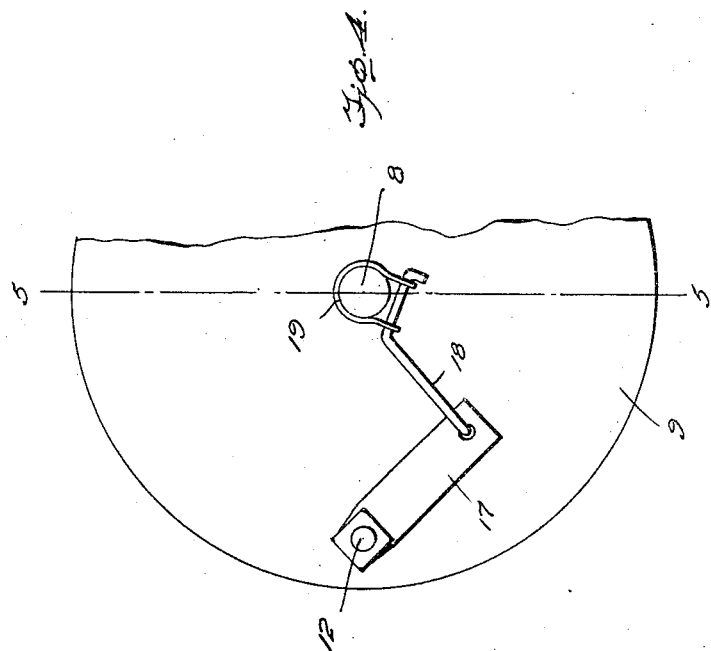

UNITED STATES PATENT OFFICE.

JOHN NATHANIEL LAVERY, OF TITUSVILLE, PENNSYLVANIA.

REVERSING MECHANISM.

1,257,253.  Specification of Letters Patent.  Patented Feb. 19, 1918.

Application filed September 15, 1916.  Serial No. 120,311.

*To all whom it may concern:*

Be it known that I, JOHN N. LAVERY, citizen of the United States, residing at Titusville, in the county of Crawford and State of Pennsylvania, have invented certain useful Improvements in Reversing Mechanism, of which the following is a specification, reference being had therein to the accompanying drawing.

The object of my present invention is to provide a clutch of improved construction, and simple and inexpensive design, by means of which a driven shaft may be rotated in either direction through the medium of a constantly rotating driving shaft.

Further objects of my invention will appear from the following description of my improved construction and arrangement of parts, which is illustrated in the accompanying drawings forming a part of this specification.

Figure 1 is a vertical longitudinal section through my improved clutch showing the same in neutral position.

Fig. 2 is a front elevation of the driven member and associated parts, showing the internal construction of the same.

Fig. 3 is a rear elevation of the driving and clutch member showing in dotted line the opposite operative positions of the latter.

Fig. 4 is a fragmentary front elevation of the driving member showing the details of the clutch operating mechanism.

Fig. 5 is a longitudinal vertical section on the line 5—5 of Fig. 4 showing in dotted lines the various positions of the operating mechanism.

In the drawings, a stationary disk is shown at 1 provided with a centrally disposed, rearwardly extending hollow shaft 2 which is fixed to any suitable support. A circular plate 3 rotatably mounted upon the shaft 2, in rear of the disk 1, is provided with a forwardly extending peripheral cylindrical member or sleeve 4 which forms a casing for the clutch and is also the driven member of the same, from which power is taken by a belt, gearing or other suitable means.

An internal gear wheel 5 is formed upon the inner surface of the cylindrical member or sleeve 4 near the rear thereof, and meshes with pinions 6 loosely mounted upon shafts 7 secured to the front of the stationary disk 1.

The driving shaft 8 of my improved clutch is journaled at its inner end within the hollow shaft 2, and has a disk 9 keyed thereto which is adapted to fit within the open end of the cylindrical member or sleeve 4. A rearwardly extending pin 10 is secured to the inner surface of the disk 9 adjacent its periphery but within the sleeve 4, and has pivoted thereon one end of two semi-circular clutch bands 11, the opposite ends of which are secured to an operating rod 12 extending through the disk 9 near its periphery, and diametrically opposite the pin 10, the two bands thereby forming a contractible and expansible ring extending rearwardly from the disk 9.

Fitting within this sleeve and adapted to be engaged thereby, is an annular clutch member 13. Loosely mounted upon the shaft 8, a gear 8' is secured in spaced relation to the rear of the clutch member 13, and meshes with the pinions 6 upon the stationary plate 1.

The rod 12 to which the clutch bands 11 are secured has a T head 15 upon its inner end, to each arm of which is pivoted a wire 16, the opposite end of which is pivoted to one of the clutch bands as clearly shown in Fig. 3. A rod 17 is secured at right angles to the outer end of rod 12, as shown in Fig. 4, and has one end of a bell crank lever 18 pivoted to its other end. The opposite end of the bell crank lever is pivoted to a sleeve 19 adapted to slide upon the driving shaft in front of the disk 9 as shown in Fig 5, and operated by any desired mechanism.

In operating my improved clutch, when the clutch bands 11 are in the position shown in full lines in Fig. 3, the driving shaft 8, and the disk 9 carrying the clutch bands 11 will be rotated without imparting motion to the remaining parts, thus providing a neutral position for the clutch.

If however, the sleeve 19 is slid forward as shown in dotted lines in Fig. 5, the rod 12 will be rotated through the bell crank lever, and the clutch bands will be consequently spread apart until they frictionally engage the inner surface of the sleeve 4, rotating the same in the same direction as they are rotating.

If it is desired to reverse the direction of rotation of the sleeve 4, the sleeve 19 is slid back to its opposite position, thus rotating the shaft 12 in the opposite direction, and contracting the clamping ring formed by the clutch bands 11 until they frictionally engage the clutch member 13, and rotate the same. The rotation of this clutch member will be imparted to the pinions 6 through the gear wheel 14, and they will drive the sleeve 4 in the reverse direction through their engagement with the internal gear 5 upon the same.

I claim:

1. In a device of the class described, in combination, a stationary disk having a rearwardly extending central hollow shaft, a plate journaled upon said shaft in rear of said stationary disk and having a forwardly extending annular sleeve forming a driven member, an internal gear formed upon the said sleeve, pinions mounted upon said stationary disk and engaging said gear, a driving shaft journaled at its rear end within the hollow shaft, a disk keyed to said last named shaft at the front end of said annular sleeve, clutch bands pivoted to the last named disk and forming a clamping ring extending rearwardly from the same, a clutch member within the sleeve, means for contracting and expanding the ring to engage the clutch member of the above mentioned annular sleeve respectively, and a gear wheel secured to said clutch member and meshing with said pinions.

2. In combination, a driven member, a driving shaft, a disk keyed upon said driving shaft, clutch bands pivoted to said disks at one end and forming a clamping ring extending rearwardly therefrom, a shaft extending through the said disk adjacent the opposed ends of said clutch bands and having a substantially T-shaped head upon its rear end, a pivotal connection between each of said clutch bands and one of the opposed ends of said T-shaped head, an angularly extending rod secured to the front end of a T shaft, a sleeve slidably mounted upon the driving shaft in front of the above mentioned disk, and a bell crank lever having its ends secured to said slidable sleeve and to the above mentioned angularly extending rod respectively.

3. In a device of the class described in combination a driving shaft, an annular sleeve loosely mounted thereon, a disk secured to said shaft at the front end of the above mentioned sleeve, clutch bands pivoted to said disk and forming a clamping ring extending rearwardly from the same within the first mentioned annular sleeve, a clutch member within the first mentioned sleeve, and means for contracting or expanding the clamping ring to engage said clutch member or the first mentioned annular sleeve respectively.

In testimony whereof I affix my signature.

JOHN NATHANIEL LAVERY.